US008724212B2

(12) United States Patent
Komatsu

(10) Patent No.: US 8,724,212 B2
(45) Date of Patent: May 13, 2014

(54) ELECTROPHORETIC DISPLAY DEVICE AND ELECTRONIC APPARATUS

(75) Inventor: Harunobu Komatsu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 130 days.

(21) Appl. No.: 13/340,215

(22) Filed: Dec. 29, 2011

(65) Prior Publication Data

US 2012/0182596 A1 Jul. 19, 2012

(30) Foreign Application Priority Data

Jan. 19, 2011 (JP) .................................. 2011-008616

(51) Int. Cl.
*G02B 26/00* (2006.01)
(52) U.S. Cl.
USPC .......................................................... 359/296
(58) Field of Classification Search
USPC .......................................... 359/296; 345/107
See application file for complete search history.

(56) References Cited

U.S. PATENT DOCUMENTS

| 8,130,441 | B2 * | 3/2012 | Frazier et al. ................. 359/296 |
| 2003/0011869 | A1 | 1/2003 | Matsuda et al. |
| 2003/0016429 | A1 | 1/2003 | Ikeda et al. |
| 2009/0201570 | A1 | 8/2009 | Frazier et al. |

FOREIGN PATENT DOCUMENTS

| JP | 11-219135 A | 8/1999 |
| JP | 2003-5225 A | 1/2003 |
| JP | 2003-5226 A | 1/2003 |
| JP | 2010-91908 A | 4/2010 |
| WO | WO-2008-084513 A | 7/2008 |

* cited by examiner

*Primary Examiner* — Tuyen Tra
(74) *Attorney, Agent, or Firm* — ALG Intellectual Property, LLC

(57) ABSTRACT

An electrophoretic display device includes a circuit substrate and an opposed substrate arranged to face each other, a dispersion liquid interposed between the circuit substrate and the opposed substrate, a plurality of platforms arranged to be spaced apart from each other with a slit therebetween in a display region on the circuit substrate, a plurality of reflectors respectively formed on top faces of the plurality of platforms, a slit electrode located in each slit, an opposed electrode formed on the opposed substrate, and an electrophoretic layer filled with a dispersion liquid which contains black particles having a different color from that of the reflectors and being dispersed in a dispersion medium.

12 Claims, 7 Drawing Sheets

ELECTROPHORETIC DISPLAY DEVICE AND ELECTRONIC APPARATUS

BACKGROUND

1. Technical Field

The present invention relates to an electrophoretic display device and an electronic apparatus including the electrophoretic display device.

2. Related Art

In known electrophoretic display devices (EPD), an electrophoretic dispersion liquid which is prepared by dispersing particles by a dispersion medium is sealed between a pair of substrates. An example of related art, JP-A-2010-91908, discloses an electrophoretic display device in which white particles (for convenience, hereinafter referred to as "white particles") and black electrophoretic particles (for convenience, hereinafter referred to as "black particles"), each having been electrically charged to opposite polarities, are dispersed into a dispersion medium and a voltage is applied between a pixel electrode formed on one substrate and an opposite electrode formed on the other substrate.

According to an electrophoretic display device, a voltage is applied between the pixel electrode and the opposite electrode thereby moving the white particles and the black particles toward different substrates opposite to each other respectively, so that an image can be displayed on a display surface.

Further, other examples of related art, JP-A-2003-5226 and JP-A-2003-5225, respectively disclose an electrophoretic display device in which black particles are dispersed into a dispersion medium, and the display includes a first display electrode located along the lower face of a stepped portion formed on one substrate for each pixel, and a second display electrode located along the upper face of the stepped portion, wherein the area that the first display electrode is formed in is colored in black and the area that the second display electrode is formed in is colored in white.

According to such an electrophoretic display device, it is possible to render a display in black or white for each pixel by applying a voltage between the first display electrode and the second display electrode so as to move the black particles to cover the first display electrode or the second display electrode. Further, this electrophoretic display device includes partition members disposed to surround the periphery of each pixel in order to inhibit the electrophoretic particles from moving between different pixels.

According to the electrophoretic display device disclosed in JP-A-2010-91908, when white color is to be displayed on a display surface, for example, the smaller the thickness of a white particle layer including a plurality of white particles is, the harder it becomes to sufficiently cover up the black particles moved to the opposed electrode side with the white particle layer, thus threatening a reduction in the reflection ratio of the white color. Therefore, in order to secure high-quality display, when displaying white on the display surface, the thickness of the white particle layer needs to be thick enough to be able to sufficiently cover up the black particles which were moved toward the pixel electrodes. This has posed a technical problem where the distance between opposite electrodes and pixel electrodes (in other words, the distance between a pair of substrates) is difficult to shorten, which necessitates the voltage to be applied between the opposite electrodes and the pixel electrodes be relatively high in order to move the white particles and black particles.

Further, there has been posed another technical problem that if the number of white particles is increased to enlarge the thickness of the white particle layer used when displaying white on a display surface, the particle concentration in a dispersion liquid is increased, which threatens to slow down the movement of the electrophoretic particles, when a voltage is applied.

Furthermore, according to the electrophoretic display device of the above-referenced related arts, JP-A-2003-5226 and JP-A-2003-5225, a voltage is applied between the first electrodes located along the lower surface of the bottom of a recess of the stepped portion and the second electrode located along the upper surface of the stepped portion, which causes the direction of an electric field to differ from the direction of electrophoresis of the particles, that is, the electric field is directed to pass through the inside of the stepped portion. Consequently, the electrophoretic particle movement speed becomes slow, which means there is a concern that the speed of display switching may become slow. In addition, partition wall members are disposed to surround the periphery of each pixel, causing an effective display region capable of displaying effectively to be smaller by the same amount of region area occupied by the partition walls, which makes it difficult to achieve high-quality display performance. Thus, there is still another technical problem.

SUMMARY

An advantage of some aspects of the invention is to solve at least part of the aforementioned problems according to any of the following embodiments or applications.

Application 1

According to an aspect of the invention according to this application, the electrophoretic display device includes a first substrate and a second substrate arranged to face each other, a display region interposed between the first substrate and the second substrate, a plurality of platforms spaced from each other with an interspatial gap therebetween and disposed in the display region on the first substrate, a plurality of reflectors formed on top of the plurality of platforms respectively, a plurality of first electrodes disposed in the interspatial gaps on the first substrate respectively, a second electrode formed on the second substrate, and a dispersion liquid provided in the display region. The dispersion liquid is prepared by dispersing electrophoretic particles, which have a different color from that of the reflectors, in a dispersion medium.

In the first application, a dispersion liquid is prepared, for example, by dispersing black electrophoretic particles in a dispersion medium, and an electrophoretic layer filled with thus prepared dispersion liquid is provided between the first substrate and the second substrate. The electrophoretic particles are dispersed in the dispersion medium while in a status of positive or negative charge. Further, a plurality of platforms are arranged on the first substrate spaced apart by an interspatial gap (namely, a slit) therebetween. The plurality of platforms are arranged in the display region to align, for example, in a matrix form. In other words, a plurality of platforms are provided in a one-on-one fashion in each of a plurality of pixels arranged in, for example, a matrix form on the display region. To cite a case, the interspatial gaps between the plurality of platforms are arranged in a planar grid pattern as seen in a plan view of the first substrate. For example, white reflectors are formed respectively on the top faces of the plurality of platforms. Also, the first electrodes are arranged in a one-on-one fashion in the interspatial gaps between the neighboring platforms. Typically, the first electrodes are arranged in each interspatial gap along the bottom face of the interspatial gap (namely, slits) between neighboring platforms. The second electrode is arranged on the second substrate opposed to the first substrate.

According to the electrophoretic display device of the application, a voltage is applied in response to an image signal, for example, between the first electrodes and the second electrode, thereby enabling high-quality display in the display region.

Specifically, a voltage is applied between the first and electrodes and the second electrode so that black electrophoretic particles, for example, are moved toward the second electrode, whereby the inner side of the second substrate, for example, can be covered by, for example, the black electrophoretic particles. As a result, it is possible to display the color (black, for example) of the electrophoretic particles with respect to each second electrode (in other words, for each pixel) in the display region. Also, voltage is applied between the first and second electrodes so that the black electrophoretic particles, for example, are moved towards the first electrodes, whereby, for example, the white reflectors can be exposed by storing the black electrophoretic particles, for example, in the interspatial gaps between the neighboring platforms. Therefore, it is possible to display the color (white, for example) of the reflectors in the display region.

Further, according to the first application, only one kind of electrophoretic particles, for example, black particles (namely, black electrophoretic particles) is dispersed in the dispersion liquid, for example. Therefore, it is possible to decrease the concentration of the electrophoretic particles contained in the dispersion liquid to be comparatively lower than a case where both the black particles and the white particles are dispersed in the dispersion liquid, for example. Thereby, it is possible to increase the electrophoretic particle movement speed in the dispersion liquid. The movement speed may be paraphrased as the response speed of the electrophoretic particles, i.e. in response to voltage applied. As a result, the display speed for switching of display is increased.

In addition, according to the first application, it is possible to reliably display white color in the display region by configuring the reflectors to be white, for example. Here, since white reflectors can scatter light multi-directionally even if the black electrophoretic particles, for example, are stored in the interspatial gaps between the neighboring platforms, the color of the electrophoretic particles has little or no practical adverse effect (such as a decrease in brightness or contrast) on the display.

As described above, the electrophoretic display device of this application is able to perform high-quality display.

Application 2

It is preferable that the electrophoretic display device described in the foregoing first application include a main body arranged with respect to the plurality of first electrodes in the interspatial gaps on the first substrate in the gap, and a side face portion arranged to extend from the main body and above the platforms along the side face portions of the platforms.

According to this second application, a voltage is applied between the first electrodes and the second electrode to move the electrophoretic particles toward the first electrodes, whereby the distance between the electrophoretic particles stored in the interspatial gaps and the upper faces of the reflectors can be increased to be longer than the length that the side face portion extends along the side face portions of the platforms. As a result, it is possible to prevent or decrease the color of the electrophoretic particles being visually recognized in the case where the color of the reflectors should be displayed. Also, when a voltage is applied between the first electrode and the second electrode thereby moving the electrophoretic particles toward the first electrode, an attraction force is generated between the side face portion of the first electrode and the electrophoretic particles and this attraction force enables the prevention or decrease of such chances that the electrophoretic particles move toward the second substrate side (in other words, the second electrode side).

Application 3

It is preferable that the electrophoretic display device described in the foregoing second application includes a main body arranged to extend along the upper face of the first substrate between the gap, and a side face portion arranged to extend from the main body, along the side faces of the platforms, and above the platforms.

According to this third application, the area occupied by the electrodes can be reduced, so that the power consumption for the entire display can also be reduced.

Application 4

In the electrophoretic display device described in the foregoing application, it is preferable that the interspatial gaps have a concentric configuration of a plurality of rectangular shapes.

According to this fourth application, the interspatial gap and the pixel are configured to have a similar shape, so that when the black particles are moved from a slit electrode toward the opposed electrode, or from the opposed electrode toward the slit electrode, the amount of movement of the particles in the horizontal direction is small, thereby enabling the electrophoresis to be smoother.

Application 5

In the electrophoretic display device described in the foregoing fourth application, it is preferable that the first electrodes have a concentric configuration of a plurality of rectangular shapes on the first substrate.

According to this fifth application, the interspatial gap and the pixel are configured to have a similar shape, so that when the black particles in the slits are moved toward the opposed electrode, the particles may be moved substantially vertically, thereby enabling the display switching to be smoother.

Application 6

In the electrophoretic display device described in the foregoing application, it is preferable that the total volume of the electrophoretic particles corresponding to the upper face of one of the platforms and the first electrodes connected thereto is smaller than the volume of the slit corresponding to the first electrode.

According to this sixth application, voltage is applied between the first electrode and the second electrode thereby to move the electrophoretic particles toward the first electrode side, whereby the electrophoretic particles can be reliably stored in the interspatial gaps.

Application 7

In the electrophoretic display device described in the foregoing application, it is preferable to include partition walls arranged between the first substrate and the second substrate and adapted to partition the display region into a plurality of regions, wherein each of the plurality of regions includes one, or a plurality, of the first electrodes.

According to this seventh application, partition walls are arranged between the first substrate and the second substrate, whereby it is possible to enhance the strength against pressure applied from the first substrate side or the second substrate side, for example. In particular, each of the plurality of regions partitioned by the partition walls includes therein a plurality of the first electrodes. Therefore, as compared with the case where, for example, partition walls are arranged to surround the periphery of each pixel, a region where the partition walls are arranged (in other words, a region not contributing to display) is smaller in the display region, thereby enabling it to perform bright, high contrast display.

Application 8

The electrophoretic display device of the eighth application is characterized by inclusion of the electrophoretic display device of the foregoing application.

According to the eighth application, the electrophoretic display device of the foregoing application is included. Therefore, it is possible to realize various electronic apparatuses capable of performing high-quality display, such apparatuses including wrist watches, electronic paper, electronic notebooks, mobile phones, portable audio devices, and so forth.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the accompanying drawings. In each of the drawings below, each layer and member is illustrated at a different scale from the real layers and members in order to make them a recognizable size.

First Embodiment

An electrophoretic display device according to the first embodiment will now be described with reference to FIG. 1 through FIG. 7.

First of all, the overall configuration of the electrophoretic display device according to the first embodiment will be described with reference to FIG. 1 through FIG. 4C.

Figure 1:
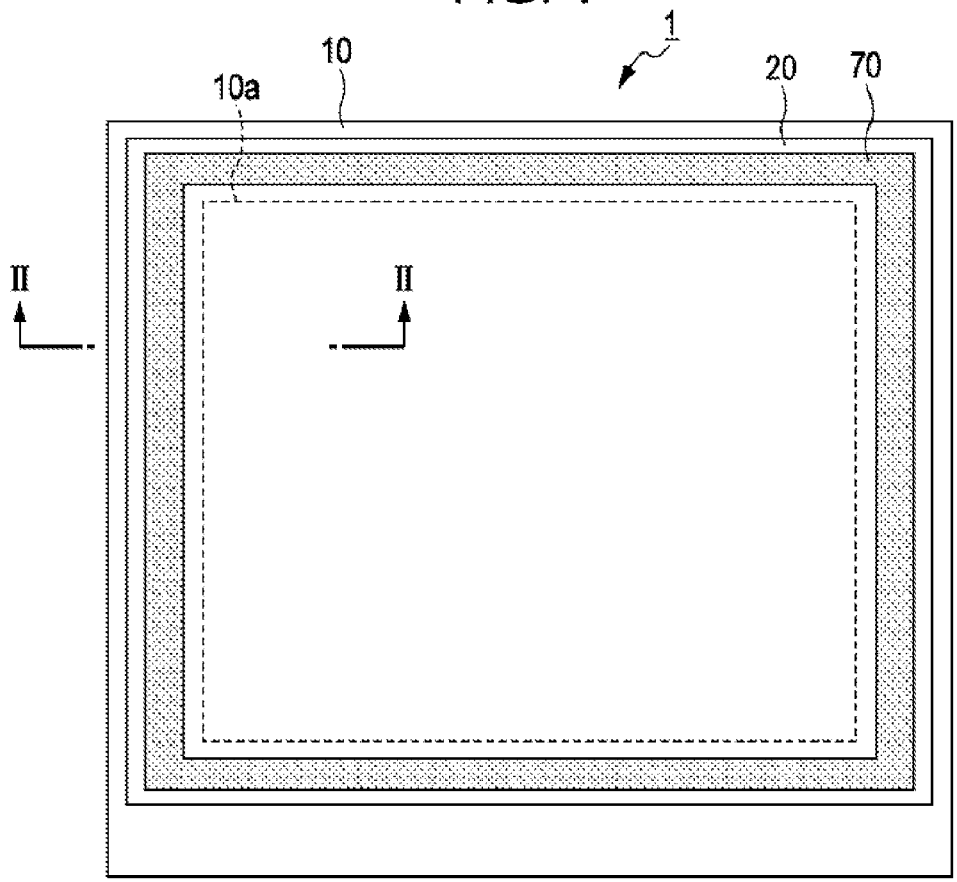
FIG. 1 is a plan view schematically showing the overall configuration of an electrophoretic display device according to the first embodiment of the invention.
Figure 2:
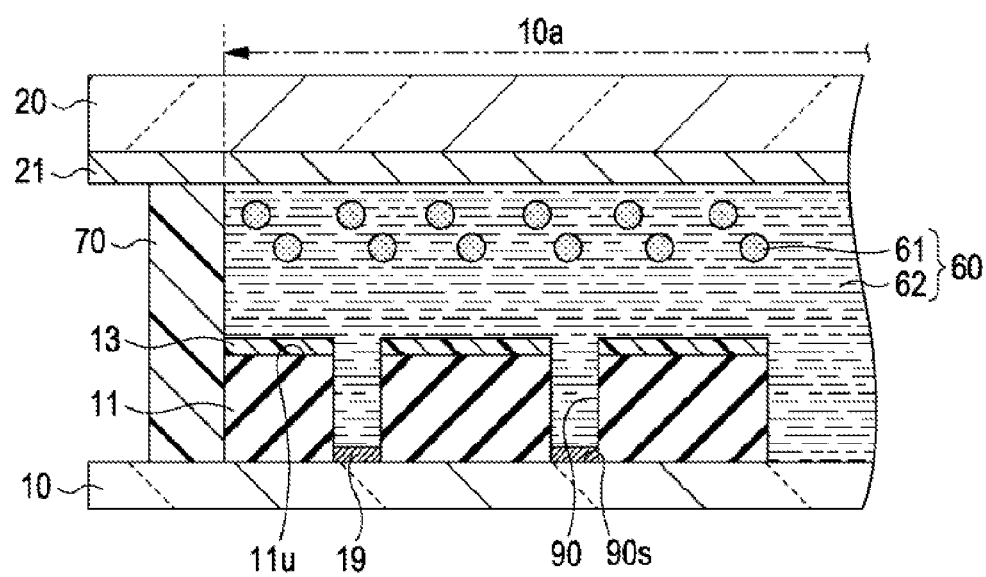
FIG. 2 is a cross-sectional view taken along a line II-II of FIG. 1.

FIG. 1 is a plan view schematically showing the overall configuration of the electrophoretic display device according to this embodiment. FIG. 2 is a cross-sectional view taken along a line II-II of FIG. 1 and schematically shows the overall configuration of the electrophoretic display device according to this embodiment.

In FIG. 1 and FIG. 2, the electrophoretic display device 1 includes a circuit substrate 10 and an opposed substrate 20 which are arranged to face each other, a dispersion liquid (electrophoretic layer) 60 provided in a display region 10a between the circuit substrate 10 and the opposed substrate 20, and a seal member 70 arranged to surround the display region 10a between the circuit substrate 10 and the opposed substrate 20. Here, the circuit substrate 10 is one example of the first substrate according to the invention, and the opposed substrate 20 is one example of the second substrate according to the invention.

The circuit substrate 10 is a substrate including various kinds of circuit elements for driving a slit electrode 19 to be described hereinbelow on a flat-plate substrate includes, for example, a resin substrate, a glass substrate, or the like.

The opposed substrate 20 is a substrate arranged with the transparent opposed electrode 21 on a flat-plate substrate composed of, for example, a resin substrate, a glass substrate, or the like. The opposed electrode 21 is one example of the second substrate according to the invention. In order that the dispersion liquid 60 may be visually recognized, a transparent electrode which allows light rays of the visible light wavelength range to transmit therethrough may be employed.

Any material having conductivity in practice may be used as a material for the transparent substrate. As a non-attributive example, the following materials may be cited, including: metal materials such as copper, aluminum, or an alloy containing these metals; carbon-based material such as carbon black; electrically conductive polymers, such as polyacetylene, polypyrrole, or derivatives thereof; ion conductive polymer materials prepared by dispersing ionic substances such as NaCl, $LiClO_4$, KCl, LiBr, $LiNO_3$, or LiSCN, in a matrix resin such as polyvinyl alcohol, polycarbonate, and polyethylene oxide; and various types of electrically conductive materials including conductive oxide materials such as indium tin oxide (ITO), tin oxide doped with fluorine (FTC)), tin oxide ($SnO_2$), or indium oxide (IO). Out of the foregoing materials, one or a combination of two or more may be used. As a non-attributive example of a transparent substrate and a transparent electrode, PET/ITO sheet NXC1 manufactured by Toray Industries, Inc. may be used.

The dispersion liquid 60 is an electrophoretic dispersion liquid prepared by dispersing a plurality of black particles 61 in a dispersion medium 62. The dispersion liquid is also referred to as an electrophoretic layer.

The black particles 61 are black electrophoretic particles as one example of the "electrophoretic particles" according to the invention. The black particles 61 include black pigments such as aniline black and carbon black, for example. The black particles 61 are, for example, dispersed in the dispersion medium 62 in a positively charged state.

The dispersion medium 62 is a medium to disperse the black particles 61. As the dispersion medium 62, the following substances may be used: water; alcoholic solvent such as methanol, ethanol, isopropanol, butanol, octanol and methyl cellosolve; various esters such as ether acetate and butyl acetate; ketones such as acetone, methyl ethyl ketone and methyl isobutyl ketone; aliphatic hydrocarbons such as pentane, hexane and octane; alicyclic hydrocarbons such as cyclohexane and methyl cyclohexane; aromatic hydrocarbons such as benzene family having long-chain alkyl groups including benzene, toluene, xylene, hexyl benzene, heptyl benzene, octyl benzene, nonyl benzene, decyl benzene, undecyl benzene, dodecyl benzene, tridecyl benzene and tetradecyl benzene; halogenated hydrocarbons such as methylene chloride, chloroform, carbon tetrachloride and 1,2-dichloroethane; carboxylate; and other oil substances. The foregoing substances may be used singularly or as a mixture. Also, the dispersion medium may contain a surfactant.

The seal member 70 is composed of a resin such as epoxy resin, silicon resin or acryl resin, for example. As shown in FIG. 1, the seal member 70 is arranged to surround the display region 10a between the circuit substrate 10 and the opposed substrate 20. The seal member 70 has a function to seal the clearance between the circuit substrate 10 and the opposed substrate 20 so that the dispersion liquid 60 does not leak out from between the circuit substrate 10 and the opposed substrate 20. Further, the seal member 70 has a function to prevent water infiltrating the dispersion liquid 60 from outside. Still further, the seal member 70 has a function to bond the circuit substrate 10 and the opposed substrate 20 to each other. Also, the resin composing the seal member 70 may contain inorganic particulates such as silica and alumina dispersed therein. In such case, infiltration of water into the dispersion liquid 60 from outside through the seal member 70 can be more reliably prevented.

Figure 3:
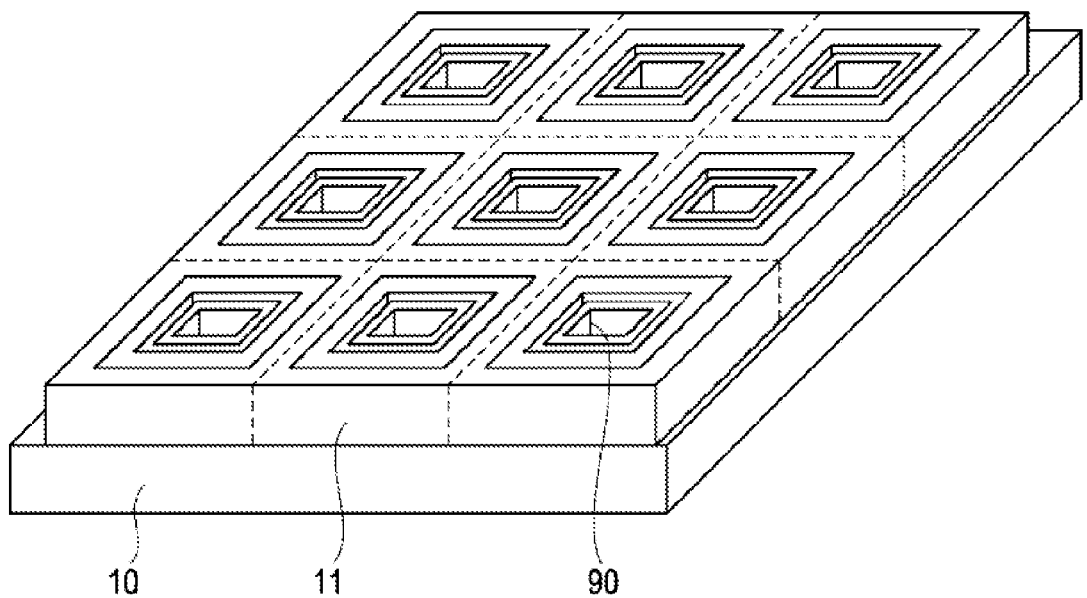
FIG. 3 is a perspective view showing the configuration of a plurality of platforms and slits of the electrophoretic display device according to the first embodiment.

FIG. 3 is a perspective view showing the configuration of the plurality of platforms and slits of the electrophoretic display device according to the first embodiment.

As shown in FIG. 2 and FIG. 3, in the display region 10a on the circuit substrate 10, the plurality of platforms 11 are arranged in a spaced-apart fashion from each other with a slit 90 therebetween. Each of the plurality of platforms 11 is formed of an insulating material, and has a substantially rectangular shape. The plurality of platforms 11 are arranged to align in a matrix form in the display region 10a. To paraphrase, the plurality of platforms 11 are allocated in a one-on-one fashion with respect to the plurality of pixels 20a arranged to align in a matrix form in the display region 10a.

The slits 90 are gaps formed between the plurality of platforms 11 arranged in a matrix form. As seen in a top plan view of the circuit substrate 10, the slits are arranged in a planar grid pattern geometry. Furthermore, the slits 90 have a width of approximately 5 μm and a depth of approximately 15 μm, for example.

As shown in FIG. 2, white reflectors 13 are located on the top faces 11u of each of the plurality of platforms 11 respectively, and slit electrodes 19 are located on the bottom faces 90s of the slits 90 respectively.

The white reflector 13 is one example of the "reflector" according to the invention, which is, for example, a white reflector composed of a resin or the like with a white pigment (such as titania) dispersed therein. The white reflectors 13 are located on top of the platforms 11 and are formed so as to cover the top faces of the platforms 11. Each white reflector 13 has a planar rectangular shape.

Figure 4A:
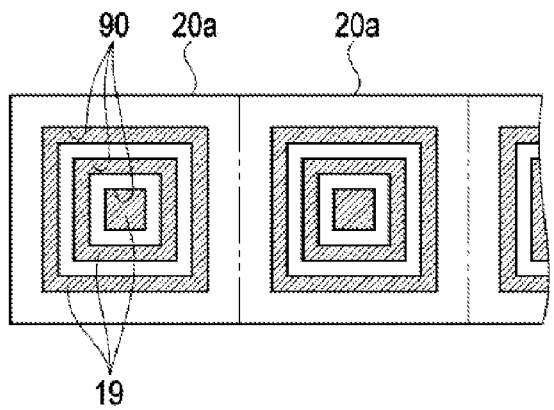
FIG. 4A is a plan view illustrating the configurations of display electrodes and slit electrodes of the electrophoretic display device according to the first embodiment.
Figure 4B:
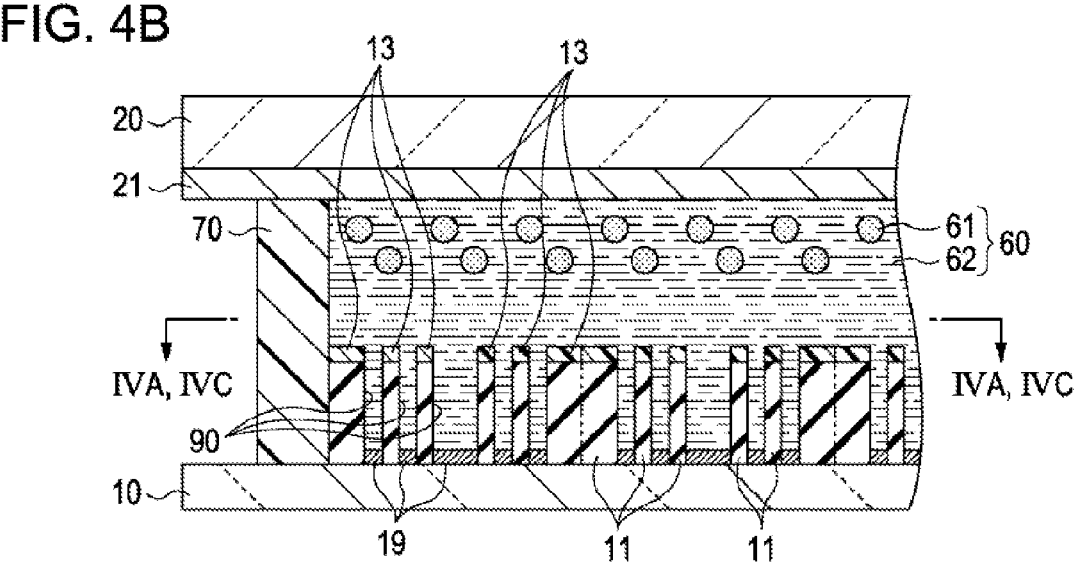
FIG. 4B is a front cross-sectional view illustrating the display electrodes and the slit electrodes of the electrophoretic display device according to the first embodiment.
Figure 4C:
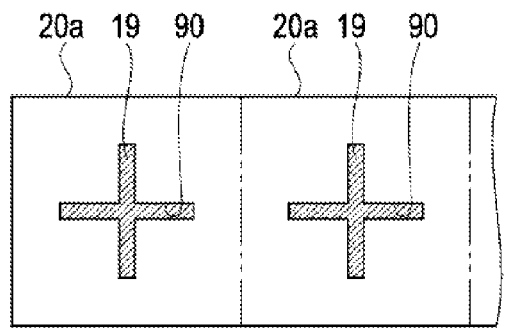
FIG. 4C is a plan view illustrating another configuration example of the slit electrodes of the electrophoretic display device according to the first embodiment.

FIG. 4A is a plan view and FIG. 4B is a cross-sectional view respectively illustrating a configuration of the white reflectors 13 and the slit electrodes 19. FIG. 4C is a plan view illustrating an example of another configuration of the slit electrodes. Here, FIGS. 4A and 4C are the views taken along a line IVA-IVA (IVC-IVC) of FIG. 4B.

In FIG. 2 and FIGS. 4A to 4C, the slit electrodes 19 are shown as an example of the "first electrode" according to the invention, which may be composed of an electrically conductive material such as aluminum, for example.

The slit electrodes 19 are allocated in a one-on-one fashion with respect to the pixels 20a. In other words, a pair of a white reflector 13 and a slit electrode 19 is provided for each of the plurality of pixels 20a forming the display region 10a. Here, the slit electrodes 19 are allocated in some of the slits 90 engraved in platforms 11 having a corresponding white reflector 13 provided thereon. The slit electrodes 19 are formed, so as to fill the width of the slits on the platforms, and to have an overall shape consisting of a combination of single or a plurality of linear shapes, as viewed from above. As an example of such a configuration, three concentrically formed rectangular slits 90 are shown in FIG. 4A and FIG. 4B. The slit electrodes 19 are allocated in some of the three slits 90 respectively (in this example, the inner side of the slit 90 on the side of the circuit substrate 10). Also, as shown in FIG. 4C, each slit 90 may be substantially cross shaped in a top plan view thereof. In this case, too, each of the slit electrodes 19 is located inside of the slits 90. However, the shape of the slits 90 is not particularly limited to this shape. Also, the slit electrode 19 may be composed of a plurality of mutually severed electrode portions.

The opposed electrode 21 are provided on the opposed substrate 20 uniformly.

Next, the electrical configuration of the electrophoretic display device according to First Embodiment will be explained with reference to FIG. 5.

Figure 5:
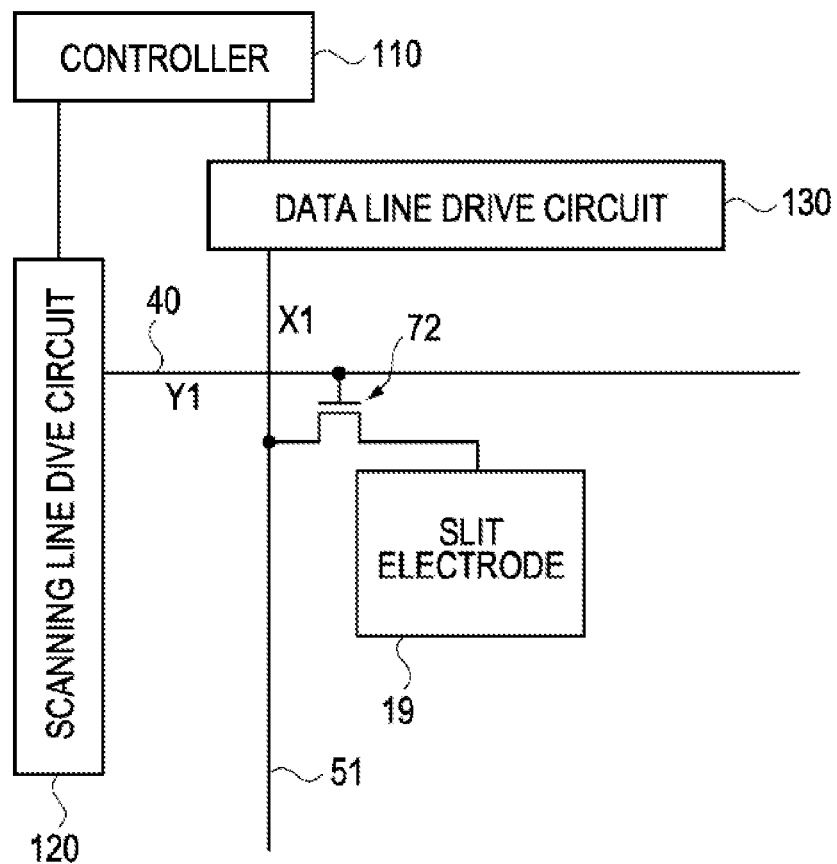
FIG. 5 is a block diagram illustrating an electrical configuration of the electrophoretic display device according to the first embodiment.

In FIG. 5, the electrophoretic display device 1 includes a controller 110, a scanning line drive circuit 120 and a data line drive circuit 130. Furthermore, the controller 110, the scanning line drive circuit 120 and the data line drive circuit 130 constitute one example of the "drive member" according to the invention. The controller 110, the scanning line drive circuit 120 and the data line drive circuit 130 are provided on the periphery of the display region 10a on the circuit substrate 10. In the display region 10a on the circuit substrate 10, m scanning lines 40 (that is to say, scanning lines Y1, Y2, . . . , Ym) and n data lines 50 (that is to say, data lines X1a, X2a, . . . , Xna) are arranged to intersect one another. More specifically, m scanning lines 40 extend in rows (namely, the direction X) and n data lines 50 extend in columns (namely, the direction Y). Pixels 20a are allocated with respect to intersections of the m scanning lines 40 and the n data lines 50.

The controller 110 controls the operation of the scanning line drive circuit 120 and the data line drive circuit 130. More specifically, the controller 110 supplies timing signals such as clock signals and start pulses, for example, to each circuit, and supplies the image signals which is to be supplied to display electrodes (not shown) thereto.

The scanning drive circuit 120 sequentially supplies a scanning signal in pulses, to each of the scanning lines Y1, Y2, . . . , Ym, based on the timing signal supplied from the controller 110.

The data line drive circuit 130 supplies image signals to the data lines X1a, X2a, . . . , Xna, based on the timing signal supplied from the controller 110. Image signals assume binary levels respectively referred to as high voltage level (hereinafter, referred to as "high level" such as of +15 V) or low voltage level (hereinafter, referred to as "low level" such as of −15 V).

Pixels 20a are provided with the aforementioned slit electrode 19 and a transistor 72. The transistor 72 has a gate electrically connected to the scanning line 40, a source electrically connected to the data line 50, and a drain electrically connected to the slit electrode 19. When the electrophoretic display device 1 is operating, a scanning signal is supplied from the scanning line drive circuit 120 to the scanning line 40 and the transistor 72 is turned on, thereby electrically connecting the slit electrode 19 and the data line 50 to each other. Subsequently, the data line 50 supplies an image signal to the slit electrode 19.

Next, the display principle of the electrophoretic display device according to the first embodiment will be explained with reference to FIG. 6 and FIG. 7.

Figure 6:
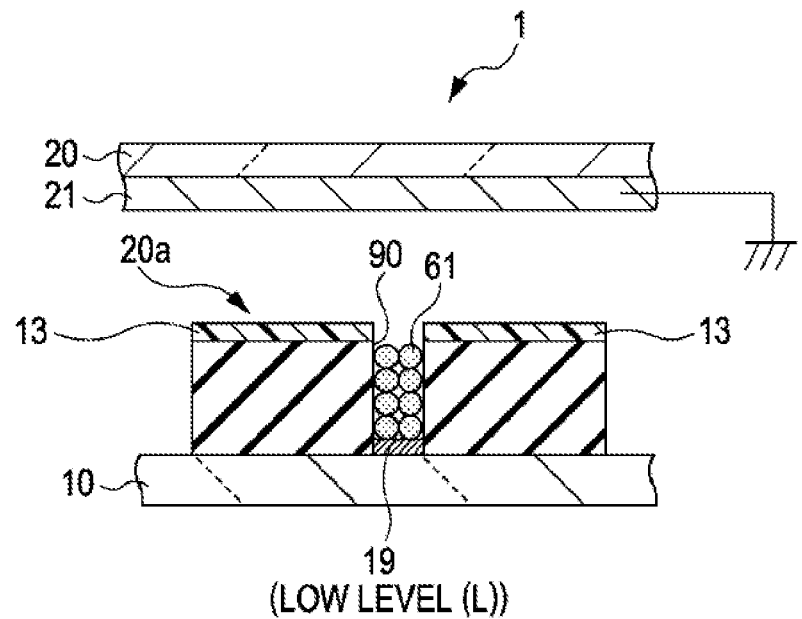
FIG. 6 is a diagram (part 1) for explaining the display principle of the electrophoretic display device according to the first embodiment.

FIG. 6 is a cross-sectional view schematically illustrating the potentials of each of the slit electrodes 19 and opposed electrodes 21, as well as the arrangement of the black particles 61 when the electrophoretic display device 1 displays white in each pixel 20a. FIG. 7 schematically illustrates the potentials of the respective slit electrodes 19 and opposed electrodes 21 as well as the arrangement of the black particles 61 when the electrophoretic display device 1 displays black in each pixel 20a.

As shown in FIG. 6, the potential level of an opposed electrode 21 is always 0. When a low level (L) image signal is supplied to the slit electrode 19, a plurality of positively charged black particles 61 are moved toward the slit electrode 19 by the electric force (coulomb force) generated in the electric field between the slit electrode 19 and the opposed electrode 21, whereby the black particles are stored in the slit 90. Accordingly, there are few or no such black particles 61 overlapping the white reflector 13 as seen in a top plan view of the circuit substrate 10 (see FIG. 1 and FIG. 2), whereby it becomes possible for the white reflectors 13 to reliably reflect light. Consequently, each pixel 21a is able to display white color.

Figure 7:
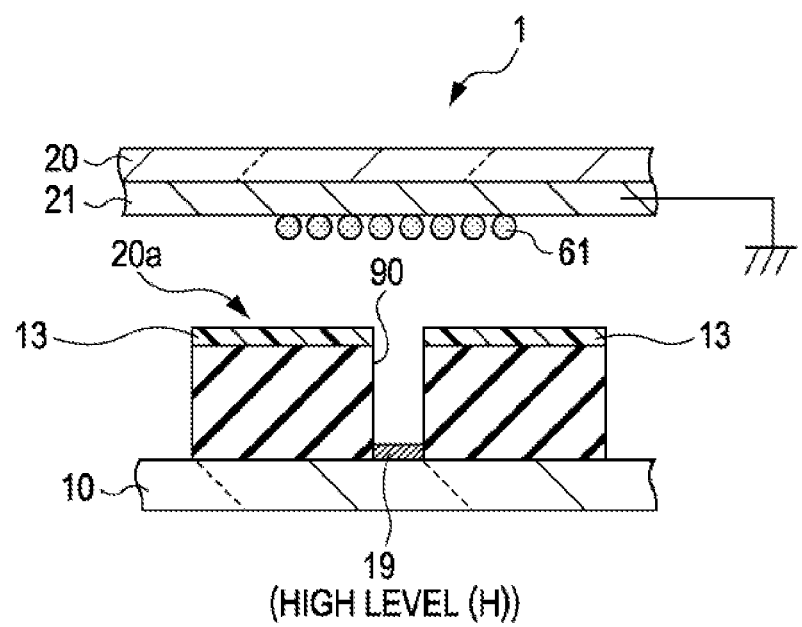
FIG. 7 is another diagram (part 2) for explaining the display principle of the electrophoretic display device according to the first embodiment.

On the other hand, as shown in FIG. 7, when the slit electrode 19 is supplied a high level (H) signal, a plurality of positively charged black particles 61 are moved towards the opposed electrode 21 side by electric force generated in the electric field between the slit electrode 19 and the opposed electrode 21, and located on the opposed substrate 20. Since the black particles 61 absorb incident light, it becomes possible to realize black color display.

According to the first embodiment, only one kind of electrophoretic particle called black particle 61 is dispersed in the dispersion liquid 60. Therefore, as compared with, for example, the case where black particles and white particles are dispersed in the dispersion liquid 60, the particle concentration of the dispersion liquid 60 can be lowered, whereby it becomes possible to increase the moving speed of the black particles 61 in the dispersion liquid 60 (in other words, the response speed of the black particles 61 in response to voltage applied between the slit electrode 19 and the opposed electrode 21). As a result, the display speed for display switching can be increased.

In addition, according to the first embodiment, white color is displayed by reflecting light using the white reflectors 13, so that white can be reliably displayed in the display region 10a. Here, since the white reflectors 13 can scatter light in many different directions, even if the black particles 61 are stored in the slits 90 between the respective neighboring platforms 11, the color of the black particles 61 (namely black) has little or practically no adverse affect (for example, reduction of brightness or contrast) on display.

According to the first embodiment in particular, the width and depth of the slits 90 are adjusted so that the total volume of the black particles 61 corresponding to each pixel 20a is smaller than the volume of the housing portion in slits 90 corresponding to each pixel 20a. Therefore, when white color is displayed with each pixel 20a, such an incident can be avoided that the plurality of black particles 61 cannot be stored in the slits 90. That is to say, the plurality of black particles 61 can be reliably stored in the slits 90.

As described above, according to the electrophoretic display device 1 according to the first embodiment, high-quality display can be performed.

Second Embodiment

An electrophoretic display device according to the second embodiment will now be described with reference to FIG. 8.

Figure 8:
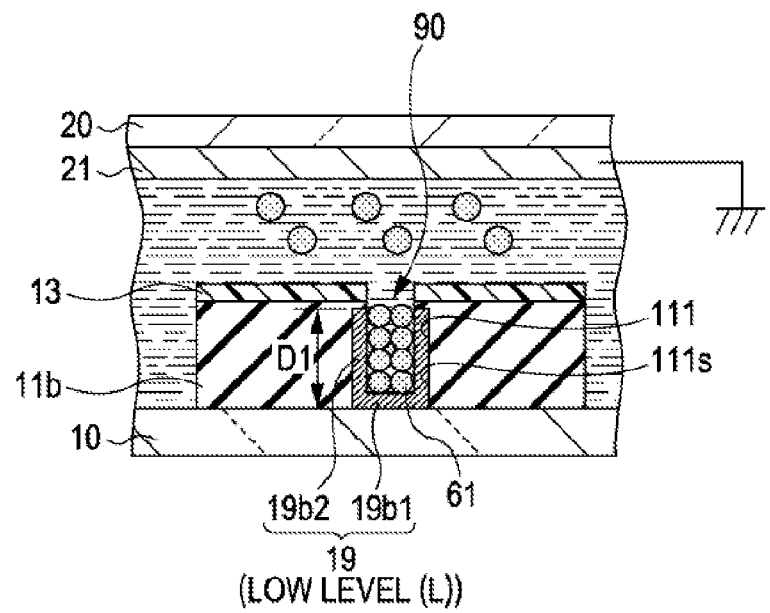
FIG. 8 is a cross-sectional view illustrating the configuration of pixels of an electrophoretic display device according to the second embodiment.

FIG. 8 is a cross-sectional view illustrating the configuration of a pixel of the electrophoretic display device according to the second embodiment. Furthermore, in FIG. 8, the same constituent elements as those shown in FIG. 1 to FIG. 7 according to the first embodiment are denoted by the same corresponding reference numerals, and each description thereof is omitted accordingly.

In FIG. 8, the electrophoretic display device according to the second embodiment includes platforms 11b and slit electrodes 19 respectively in place of the platforms 11 and the slit electrodes 19 according to the first embodiment. In regard to this point, the electrophoretic display device 1 according to the second embodiment differs from the electrophoretic display device 1 according to the first embodiment, but the remaining components are constituted in a substantially like manner.

As shown in FIG. 8, each of the platforms 11b has a notched portion 111 formed by notching a part of the platform 11b on the slit 90 side. The notched portion 111 is formed to extend from the lower face 11bu of the platform 11b toward the upper side of the slit 90 (see FIG. 2) for a length of D1. The slit electrode 19 includes a slit electrode main body 19b1 formed along the lower face of the slit 90 and a slit electrode side portion 19b2 extended along the side face 111s of the notched portion 111 of the platform 11b. White reflector 13 is located on top of the platform 11b. Also, FIG. 8 illustrates a state where a plurality of black particles 61 are stored in the slit 90 by supplying a low level (L) signal to the slit electrode 19.

According to thus constituted electrophoretic display device according to the second embodiment, the contact area of the black particles 61 stored in the slit 90 and the slit electrode 19 becomes larger, causing an attraction force to be generated which enables it to lessen or prevent the movement of the black particles 61 toward the opposed substrate 20.

In this result, high-quality display can be performed by the electrophoretic display device according to the second embodiment.

Third Embodiment

An electrophoretic display device according to the third embodiment will now be described with reference to FIG. 9.

Figure 9:
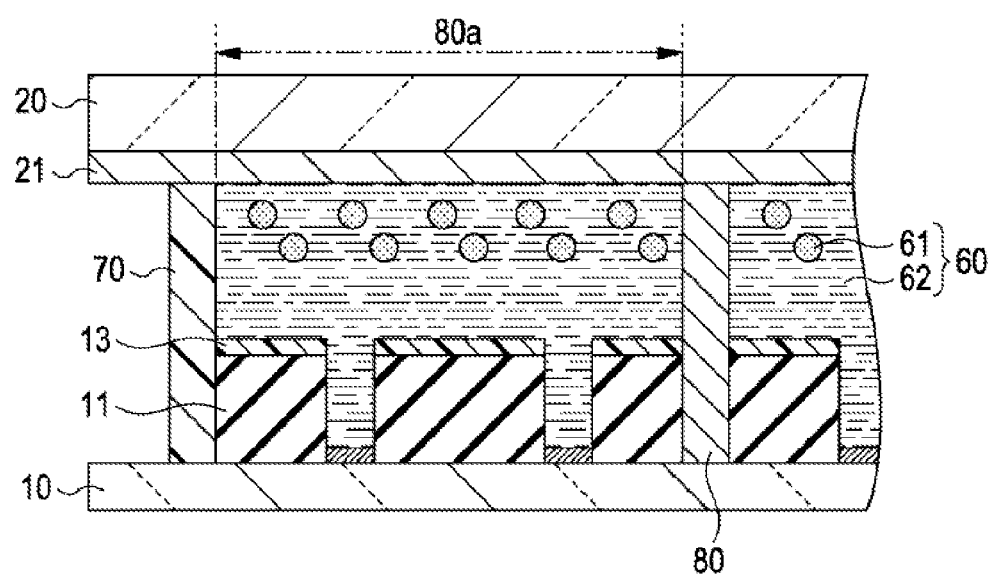
FIG. 9 is a cross-sectional view illustrating the configuration of an electrophoretic display device according to the third embodiment.

FIG. 9 is a cross-sectional view illustrating a configuration of the electrophoretic display device according to this embodiment. In FIG. 9, constituent elements similar to those as shown in FIG. 1 to FIG. 7 according to the first embodiment are denoted by the same corresponding reference numerals, and each description thereof is omitted accordingly.

In FIG. 9, the electrophoretic display device according to the third embodiment further includes a partition wall 80. In this regard, the electrophoretic display device according to the third embodiment differs from the electrophoretic display device 1 according to the first embodiment, but the remaining components are constituted in a substantially same as the electrophoretic display device 1 according to the first embodiment.

As shown in FIG. 9, a partition wall 80 is located between a circuit substrate 10 and an opposed substrate 20 in a fashion to divide the display region 10a into a plurality of regions 80a. The partition walls 80 are arranged to have a grid pattern planar shape, for example.

According to the third embodiment, the partition walls 80 are located between the circuit substrate 10 and the opposed substrate 20, thereby enabling it to increase the strength thereof against the pressure applied either from the circuit substrate 10 or the side of the opposed substrate 20, for example.

According to the third embodiment, in particular, a plurality of display electrodes are included in each of the plurality of regions 80a divided by the partition walls 80 (in other words, a plurality of pixels 20a are included). Therefore, as compared with such a case where the partition walls 80 are arranged to surround each pixel 20a, for example, the region where the partition walls 80 are arranged (in other words, the region not contributing to display) in the display region 10a becomes smaller, thereby enabling it to perform bright and high-contrast display.

Electronic Apparatus

Next, an electronic apparatus utilizing the aforementioned electrophoretic display device will be described with reference to FIG. 10 and FIG. 11. Hereinbelow, the cases of an electronic paper and an electronic notebook respectively utilizing the aforementioned electrophoretic display device will be exemplified.

Figure 10:
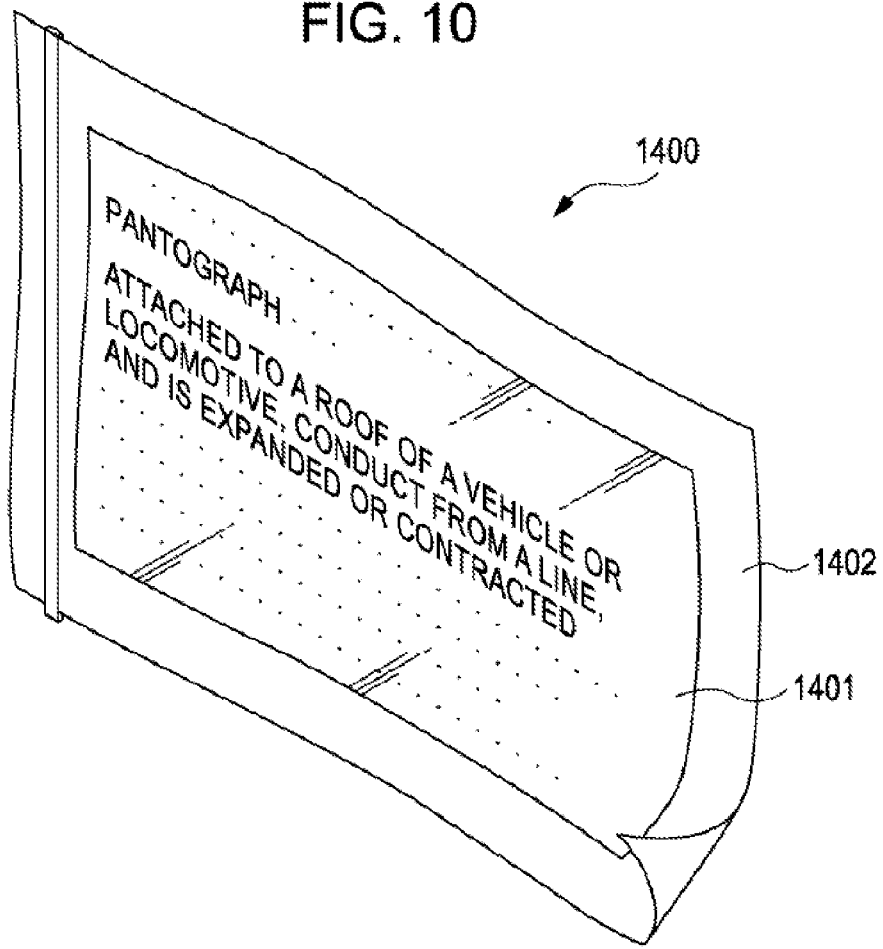
FIG. 10 is a perspective view illustrating a configuration of an electronic paper as one example of electronic devices utilizing an electrophoretic display device.

FIG. 10 is a perspective view illustrating the configuration of an electronic paper as one example of electronic apparatuses.

As shown in FIG. 10, an electronic paper 1400 includes therein the aforementioned electrophoretic display device as a display 1401 thereof. The electronic paper 1400 has flexibility and is configured by including a main body 1402 composed of a rewritable sheet having the same texture and flexibility as of conventional paper.

Figure 11:
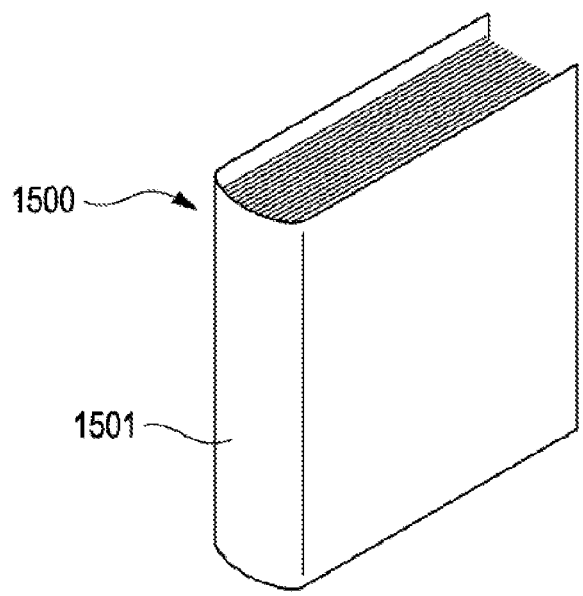
FIG. 11 is a perspective view illustrating a configuration of an electronic notebook as one example of electronic devices utilizing an electrophoretic display device.

FIG. 11 is a perspective view illustrating the configuration of an electronic notebook as one example of electronic apparatuses.

As shown in FIG. 11, an electronic notebook 1500 is composed of a plurality of sheets of the electronic paper 1400 shown in FIG. 10, which are bound in a cover 1501. The cover 1501 includes, for example, display data for receiving display data sent from external devices, and display data input means (not shown) for inputting data. Thereby, in response to the display data, the content of display can be changed or updated with the sheets of electronic paper being in the bound state.

The aforementioned electronic paper 1400 and the electronic notebook 1500 respectively include therein the electrophoretic display device according to the aforementioned embodiments, whereby high-quality image display can be performed.

The present invention is not limited to the above described embodiments, and modifications may be made as appropriate without violating the subject matter or philosophy of the invention which is interpretable from the scope of claims and the entire specification. Thus modified electrophoretic display devices and electronic apparatus including the modified electrophoretic display device fall within the technical scope of the present invention.

The entire disclosure of Japanese Patent Application No. 2011-008616, filed Jan. 19, 2011 is expressly incorporated by reference herein.

What is claimed is:

1. An electrophoretic display device comprising:
   a first substrate and a second substrate arranged to face each other;
   an electrophoretic layer interposed between the first and second substrates;
   a plurality of platforms located between the electrophoretic layer and the first substrate, the plurality of platforms being spaced apart from each other with a slit therebetween;
   a plurality of reflectors located on top faces of the plurality of platforms respectively;
   a plurality of first electrodes arranged in each of the slits respectively;
   a second electrode located between the electrophoretic layer and the second substrate; and
   a dispersion liquid filled in the electrophoretic layer which includes electrophoretic particles having a color different from that of the reflectors, the electrophoretic particles being dispersed in a dispersion medium,
   wherein the first electrode includes a main body located on the first substrate in the slit, and a side face portion arranged to extend from the main body, along a side face of the platforms, and above the platform in the slit.

2. The electrophoretic display device according to claim 1, wherein a plurality of the first electrodes are located in each of the slits.

3. The electrophoretic display device according to claim 1, wherein the slits are formed to be a plurality of concentric rectangular shapes.

4. The electrophoretic display device according to claim 1, wherein the first electrodes are formed to be a plurality of concentric rectangular shapes on the first substrate.

5. The electrophoretic display device according to claim 1, wherein a total volume of the electrophoretic particles is smaller than a total volume of the slits.

6. The electrophoretic display device according to claim 1, further including a partition wall located between the first and second substrates to divide the electrophoretic layer into a plurality of regions, wherein at least one of the first electrodes is located corresponding to each of the plurality of regions.

7. An electronic apparatus including the electrophoretic display device according to claim 1.

8. An electrophoretic display device comprising:
   a first substrate and a second substrate arranged to face each other;
   an electrophoretic layer interposed between the first and second substrates;
   a plurality of platforms located between the electrophoretic layer and the first substrate, the plurality of platforms being spaced apart from each other with a slit therebetween;
   a plurality of reflectors located on top faces of the plurality of platforms respectively;
   a plurality of first electrodes arranged in each of the slits respectively;
   a second electrode located between the electrophoretic layer and the second substrate; and
   a dispersion liquid filled in the electrophoretic layer which includes electrophoretic particles having a color different from that of the reflectors, the electrophoretic particles being dispersed in a dispersion medium,
   wherein the slits are formed to be a plurality of concentric rectangular shapes.

9. The electrophoretic display device according to claim 8, wherein a plurality of the first electrodes are located in each of the slits.

10. An electrophoretic display device comprising:
a first substrate and a second substrate arranged to face each other;
an electrophoretic layer interposed between the first and second substrates;
a plurality of platforms located between the electrophoretic layer and the first substrate, the plurality of platforms being spaced apart from each other with a slit therebetween;
a plurality of reflectors located on top faces of the plurality of platforms respectively;
a plurality of first electrodes arranged in each of the slits respectively;
a second electrode located between the electrophoretic layer and the second substrate; and
a dispersion liquid filled in the electrophoretic layer which includes electrophoretic particles having a color different from that of the reflectors, the electrophoretic particles being dispersed in a dispersion medium,
wherein the first electrodes are formed to be a plurality of concentric rectangular shapes on the first substrate.

11. The electrophoretic display device according to claim 10,
wherein a plurality of the first electrodes are located in each of the slits.

12. The electrophoretic display device according to claim 10,
wherein the slits are formed to be a plurality of concentric rectangular shapes.

* * * * *